July 29, 1924.
W. H. COLLINS
DRINKING FOUNTAIN
Original Filed March 1, 1922
1,502,847
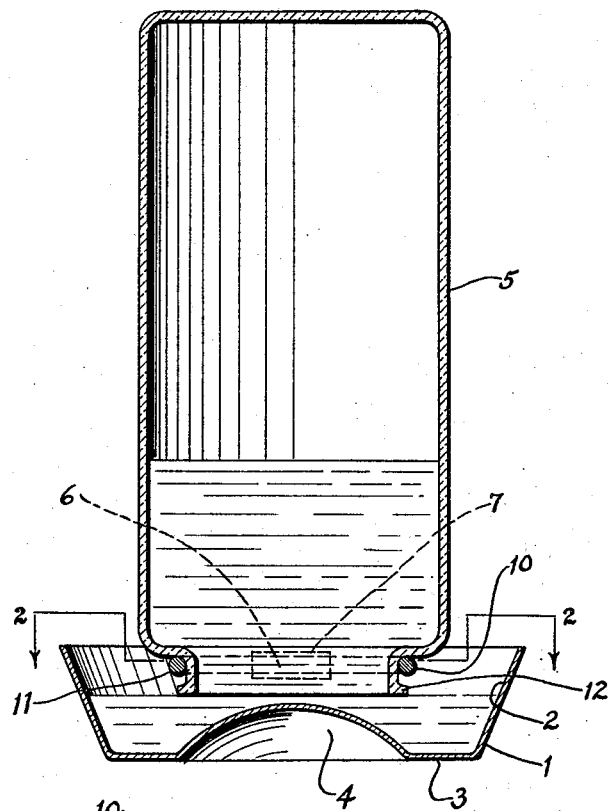
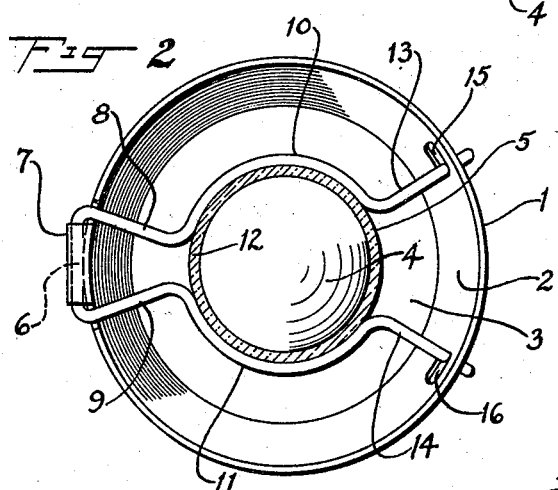
INVENTOR
W. H. Collins
BY
John D. Morgan
ATTORNEY Patented July 29, 1924.

1,502,847

UNITED STATES PATENT OFFICE.

WALTER H. COLLINS, OF SUMMIT, NEW JERSEY.

DRINKING FOUNTAIN.

Application filed March 1, 1922, Serial No. 540,192. Renewed June 25, 1924.

*To all whom it may concern:*

Be it known that I, WALTER H. COLLINS, a citizen of the United States, residing at Summit, in the county of Union and State of New Jersey, have made certain new and useful Improvements in Drinking Fountains, of which the following is a specification.

The invention relates to a novel and useful drinking fountain for animals, and more especially for chicks, and similar small animals.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a central, vertical section through a device embodying the invention; and Fig. 2 is a horizontal section, taken on line 2—2 of Fig. 1.

The invention is directed to a novel and useful reservoir drinking fountain for chicks and other small animals, of the general type which employs an inverted jar, such as a fruit jar, as a reservoir gradually supplying water into a pan or bottom receptacle to keep the water therein at a constant level.

The principal objects of the present invention are to provide a device of this kind of sturdy and durable construction, adapted to take jars with various sized mouths, and to hold them firmly and securely, while permitting rapid and easy insertion and withdrawal of jars; to provide a strong and resilient jar holder, which is practically non-displaceable, and to have a fountain or pan wherein all the water in the reservoir is available for drinking as it flows out into the fountain or pan. Other objects and advantages of the invention will be set forth in connection with the following detailed description.

Referring now in detail to the present preferred form of the invention, illustrated by way of example in the accompanying drawings, a fountain or pan 1 is shown of circular form, with its side wall 2 preferably outwardly and upwardly flaring, to provide easy access for the chicks' heads at any point about the jar. The bottom 3 of the pan is preferably provided with a central raised part 4, shown of parti-cylindrical conformation, located beneath the mouth of the reservoir jar. This will cause the last part of the water in the jar to flow to the outer peripheral part of the bottom 3 where it will be available for drinking.

The holder for the reservoir jar comprises a somewhat heavy and resilient wire having a medial supporting portion 6, mounted within a turned-over part 7 of the wall of the pan 1. From the part 6 the wire extends forwardly into the pan in two spaced-apart inwardly-extending parts 8 and 9, which are curved horizontally at 10 and 11 to receive the neck 12 of the jar. The jar holder from the parts 10 and 11 terminates in two preferably straight and divergently disposed parts 13 and 14, which pass through and are movably supported in loose fitting and horizontally elongated slots 15 and 16 in the wall 2 of the pan 1, the parts 13 and 14 pressing resiliently against the adjacent ends of their respective slots 15 and 16.

The jar holder is thus supported in the pan wall at both ends thereof and cannot be detached or displaced and lost, while at the same time the utmost degree of resiliency and variation in position is secured to accommodate jar necks of different sizes. The form of the jar holder is also such as to provide a maximum of resiliency with the requisite degree of movement for accommodating various sizes of jar necks.

Due to the form and manner of supporting the jar holder whereby freedom of movement is obtained while preserving a full degree of resilient pressure on the jar neck, it will be found practicable to insert the jar neck by merely pushing it in, without turning or screwing, and to withdraw it in the same manner, the jar being firmly held in position notwithstanding this ease of insertion and withdrawal.

The exact details of construction and arrangement of the present embodiment may be departed from, within the scope of the accompanying claims, without departing from the principles of the invention and without sacrificing its chief advantages.

What I claim is:—

1. A reservoir drinking fountain including in combination a pan, and a jar holder comprising a wire resiliently movable to receive and hold the jar neck and having its ends and medial portion permanently engaging the pan wall.

2. A reservoir drinking fountain including in combination a pan, and a jar holder comprising a wire resiliently movable in and out to receive and hold the jar neck and having its ends permanently but movably engaging the pan wall in various positions.

3. A reservoir drinking fountain including in combination a pan, and a jar holder comprising a wire having two parts horizontally spaced apart and tending to move resiliently toward each other, for gripping a jar neck, and having its ends permanently but movably engaging the pan wall in whatever positions the neck gripping portions of the wire may be.

4. A reservoir drinking fountain including in combination a pan, and a jar holder comprising a resilient wire the intermediate part of which is attached to the pan wall and the side reaches of which respectively engage opposite sides of the neck of the jar and then pass outwardly without crossing each other into movable engagement with the other side of the pan.

5. A reservoir drinking fountain including in combination a pan, and a jar holder comprising a wire having an intermediate part supported by the pan wall and extending away therefrom in two reaches having horizontally curved parts to fit resiliently about the jar neck the ends of the two parts resting freely in horizontally elongated slots in the pan wall.

6. A reservoir drinking fountain including in combination a pan, and a jar holder comprising a wire having an intermediate part supported by the pan wall and extending away therefrom in two reaches having horizontally curved parts to fit resiliently about the jar neck the ends of the two parts resting freely in the adjacent ends of horizontally elongated slots in the pan wall.

7. A reservoir drinking fountain including in combination a pan, and a jar holder comprising a wire having an intermediate part supported by the pan wall and extending away therefrom in two reaches having horizontally curved parts to fit resiliently about the jar neck the ends of the two parts continuing outwardly without crossing and resting freely in horizontally elongated slots in the pan wall.

8. A reservoir drinking fountain including in combination a pan, and a jar holder comprising a wire having an intermediate part supported by the pan wall and extending away therefrom in two reaches having horizontally curved parts to fit resiliently about the jar neck the ends of the two parts continuing outwardly without crossing and resting freely in the adjacent ends of horizontally elongated slots in the pan wall.

9. A reservoir drinking fountain including in combination a pan, and a jar holder comprising a wire having an intermediate part undetachably supported by the pan wall and extending away therefrom in two reaches having horizontally curved parts to fit resiliently about the jar neck the ends of the two parts resting freely in horizontally elongated slots in the pan wall.

In testimony whereof, I have signed my name to this specification.

WALTER H. COLLINS.